Patented Oct. 10, 1950

2,524,866

UNITED STATES PATENT OFFICE 2,524,866

CONVERSION OF ACETYLENIC ALCOHOLS IN THE VAPOR PHASE

Edwin V. Winslow, Jr., Philadelphia, Pa., assignor to Publicker Industries Inc., Philadelphia, Pa., a corporation of Pennsylvania No Drawing. Application November 14, 1947, Serial No. 786,143

3 Claims. (Cl. 260—603)

The present invention relates to a novel method for the manufacture of valuable products by the catalytic conversion of acetylenic alcohols. More particularly, it pertains to the manufacture of valuable end products such as, olefinic-acetylenic hydrocarbons, unsaturated ketones, and unsaturated aldehydes by means of the catalytic vapor phase conversion of 1-alkynols containing an active hydrogen atom in the one-position and having the general formula:

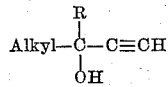

in which the substituent R represents either hydrogen, alkyl or an aryl group.

1-alkynols contemplated by the above general formula are 3-phenyl-1-butyne-3-ol, 3-methyl-1-pentyne-3-ol, 3-methyl-1-heptyne-3-ol, 3-methyl-1-butyne-3-ol, 1-butyne-3-ol, 3-ethyl-1-octyne-3-ol, 1-nonyne-3-ol, 1-hexyne-3-ol, 4-ethyl-1-octyne-3-ol, 3,5-dimethyl-1-hexyne-3-ol, 3-methyl-1-nonyne-3-ol, and the like.

It is an object of this invention to produce unsaturated ketones by means of a novel process involving the direct hydration of the corresponding olefinic-acetylenic hydrocarbons.

It is a further object of the present invention to provide a novel method for converting 1-alkynols into their corresponding unsaturated aldehydes.

It is a still further object of the present invention to provide a novel catalyst, by the use of which, the above and other valuable products can be produced in conversions of the order of 95% and above.

Other objects of the present invention will be apparent from the description which follows:

Attempts have previously been made to convert by liquid phase methods 1-alkynols of the type contemplated herein; however, the conversions and yields obtained in effecting such a process proved to be too unsatisfactory to justify any commercial exploitation or application thereof. Moreover, previous processes involving the utilization of vapor phase methods, while capable of producing the corresponding olefinic-acetylenic hydrocarbons in substantial quantities, yielded practically none of the corresponding valuable and highly reactive unsaturated ketones and/or aldehydes.

It has now been found that 1-alkynols of the aforesaid type can be efficiently converted into valuable products including the corresponding olefinic-acetylenic, unsaturated ketone, and unsaturated aldehyde compounds, by contacting said 1-alkynols in the vapor phase at elevated temperatures with a catalyst prepared by impregnating a suitable inert carrier with phosphoric acid. Thus, for example, 3-methyl-1-butyne-3-ol can, according to the present invention, be transformed in excellent conversions to 2-methyl-1-buten-3-one, 2-methyl-1-buten-3-yne, and 3-methyl-2-buten-1-al. The quantity of each end product formed is dependent to some extent upon the space velocity and temperature employed. Moreover, it has been found possible to increase the quantity of end products and to control the ratio of such products formed by controlling the concentration of water in the reaction mixture. Thus, it has been found that a preponderance of the olefinic-acetylenic compound is formed when substantially anhydrous reaction mixtures are utilized; whereas, with reaction mixtures containing up to as much as 50% water, there is a tendency to favor the formation of greatly increased quantities of the corresponding unsaturated ketone and aldehyde. In this connection, the formation of the unsaturated ketones in this process involves a heretofore unknown reaction, i. e., the direct hydration of the triple bond in olefinic-acetylenic compounds and the subsequent rearrangement of the resulting hydration product to the corresponding unsaturated ketone.

In accordance with the present invention, the 1-alkynols vapor which is preferably, although not necessarily, admixed with water, is introduced at elevated temperature in the reaction chamber of a catalytic vapor phase reactor of conventional design and passed over a catalyst prepared by impregnating a suitable inert carrier with phosphoric acid (ortho-phosphoric acid).

The temperature utilized in effecting the process may vary widely; however, in general it has been found that temperatures ranging from about 150° C. to about 250° C. are generally satisfactory.

The particular space velocity employed is also of substantial importance in determining the optimum temperature for the conversion of a given 1-alkynol and may likewise vary considerably; in general, it has been found that space velocities of from about 200 cc. to 4,000 cc. (liquid feed), or higher, per hour per liter of catalyst give optimum conversions and yields of the desired end products. The catalyst carrier utilized may be any of the well known inert carriers; however, I have found in general, that in the majority of instances comparatively good yields of the desired products, including the unsaturated ketones and aldehydes, can be obtained by employing a carrier consisting essentially of finely divided calcined diatomaceous earth. Other examples of carriers suitable for use in the process of the present invention are silica bonded alpha aluminum oxide and silica gel.

In preparing the catalyst employed in the present invention, the desired carrier or support is impregnated with phosphoric acid, preferably in the form of an 85% solution, after which the impregnated carrier is permitted to dry and then ignited. In this connection, it has been observed that catalysts having optimum activities are obtained by generally employing ignition temperatures in the neighborhood of 500° C. to 600° C., although relatively active catalysts can be obtained by utilizing ignition temperatures in the range of 400° C. to 450° C. The final physical structure of the catalyst may be either in the form of granules, i. e., generally about 6 to 12 mesh, or in the form of cylindrical pellets produced preferably by mixing concentrated phosphoric acid with the carrier material in granular or powder form and thereafter extruding the resulting dough-like mass through a suitable die, after which the extruding material can be cut into lengths of ½", or less. Between runs the catalyst may be suitably regenerated with air at temperatures of from about 450° C. to 500° C. in order to remove the carbonaceous material deposited during the run. In regard to the above, it is to be strictly understood that the term "catalyst" as used throughout the present disclosure and claims is to be construed as a catalyst which has been prepared in accordance with the foregoing or equivalent conditions.

The present invention may be further illustrated by the following specific examples:

Example 1

To 88 cc. of 85% phosphoric acid is added, with occasional stirring, 132.3 grams of Celite V (a granular calcined diatomaceous earth, 6–8 mesh, manufactured by Johns-Manville) at a temperature of 80° C. After fifteen minutes the mixture is transferred to a Buchner funnel and allowed to drain. The residue thus obtained is then placed in an evaporating dish, transferred to an oven at 110° C. and dried for a period of six hours. Thereafter, the dried residue is ignited at 500° C. for a period of four hours. A mixture consisting of 75% 3-methyl-1-butyne-3-ol and 25% water is then mixed, vaporized, and passed over the catalyst, prepared as described above, at a temperature of from 197° C. to 218° C., at an average space velocity of 1890 cc. (liquid feed) per hour per liter of catalyst for a period of twelve hours after which the reaction chamber is flushed with an inert gas and the catalyst treated with a current of air at 400° C. for from three to four hours. The temperature is then reduced to between 190° C. and 200° C., and introduction of the 3-methyl-1-butyne-3-ol vapor resumed under the conditions above stated. The conversion of 3-methyl-1-butyne-3-ol amounts to 98.2% and 3-methyl-2-buten-1-al, 3-methyl-3-buten-1-yne, and 2-methyl-1-buten-3-one are obtained in yields of 26.2%, 43.4%, and 11.2%, respectively. 3-phenyl-1-butyne-3-ol, 3-methyl-1-octyne-3-ol, 1-hexyne-3-ol, and 3-methyl-1-heptyne-3-ol, when treated in accordance with the conditions set forth above, yield the corresponding unsaturated aldehydes, unsaturated ketones, and olefinic-acetylenic hydrocarbons in comparable yields and conversions.

The example which follows illustrates the capability of the catalysts of my invention to promote the reaction involving the direct hydration of the triple bond in an olefinic-acetylenic hydrocarbon.

Example 2

To 88 cc. of 85% phosphoric acid is gradually added with occasional stirring, 132.3 grams of powdered calcined diatomaceous earth. The resulting mixture is then heated at about 80° C. until it becomes dough-like in consistency. Thereafter, the mixture is extruded through a die ¼" in diameter, and cut in cylindrical pellets ¼" to ½" in length. After these pellets are dry they are ignited at 300° C. for five hours. A mixture consisting of 65% 2-methyl-1-buten-3-yne and 35% water is then mixed, vaporized, and passed over the catalyst prepared as described above at a temperature of from about 235° C. to 250° C. at an average space velocity of 1950 cc. (liquid feed) per hour per liter of catalyst for a period of ten hours after which the reaction chamber is flushed with an inert gas, and the catalyst treated with a current of air at 400° C. for four hours. The temperature is then reduced to 190° C. and introduction of the 2-methyl-1-buten-3-yne resumed under the conditions above stated. The conversion of 2-methyl-1-buten-3-yne amounts to 32% corresponding to a yield of 85% of 2-methyl-1-buten-3-one, and 15% of a residue which consists principally of 2-methyl-1-buten-3-one dimer.

It is to be strictly understood that the foregoing examples are merely illustrative of the present invention and are to be in no way construed as limitative thereof. As will be apparent to those skilled in the art, the process of the present invention is susceptible of numerous modifications without departing from the scope thereof. Thus, for example, while the preparation of the catalyst employed as set forth above involves impregnation of phosphoric acid by contacting the catalyst carrier therewith, it is to be strictly understood that I do not desire to limit myself to catalysts so prepared, since a catalyst formed from any combination of carrier and phosphoric acid or compound capable of yielding phosphoric acid, or its equivalent, under the conditions of treatment prescribed herein, will be found to be operative in the process of my invention.

What I claim is:

1. A process for converting 1-alkynols having an active hydrogen atom in the one-position and having the general formula:

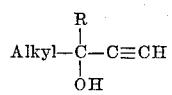

in which R is a member of the group consisting of hydrogen, aryl and alkyl, to a mixture of

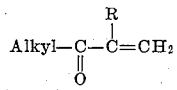

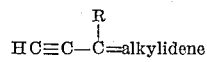

and

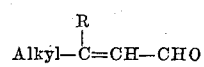

which comprises passing a vapor-phase reaction mixture consisting essentially of from about 50% to 75% of a 1-alkynol of the aforesaid type and from 25% to 50% water over a catalyst comprising an inert carrier selected from the group consisting of finely divided diatomaceous earth, silica bonded aluminum oxide and silicia gel, said carrier having been impregnated with phosphoric acid, at a temperature of between about 150° C. and about 250° C.

2. A process for converting 1-alkynols having an active hydrogen atom in the one-position and having the general formula:

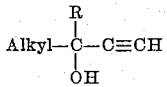

in which R is a member of the group consisting of hydrogen, aryl and alkyl, to a mixture of

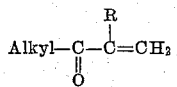

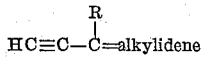

and

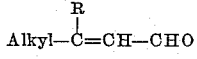

which comprises passing a vapor-phase reaction mixture consisting essentially of from about 50% to 75% of a 1-alkynol of the aforesaid type and from 25% to 50% water over a catalyst comprising an inert carrier selected from the group consisting of finely divided diatomaceous earth, silica bonded aluminum oxide and silica gel, said carrier having been impregnated with phosphoric acid.

3. In a process for the conversion of 3-methyl-1-butyn-3-ol to a mixture of 2-methyl-1-buten-3-one, 2-methyl-1-buten-3-yne and 3-methyl-2-buten-1-al, the step which comprises passing a vapor-phase reaction mixture consisting essentially of from about 50% to 75% of 3-methyl-1-butyn-3-ol and from about 25% to 50% water, over a catalyst comprising essentially finely divided calcined diatomaceous earth which has been impregnated with phosphoric acid.

EDWIN V. WINSLOW, Jr.

REFERENCES CITED

The following references are of record in the file of this patent:

UNITED STATES PATENTS

| Number | Name | Date |
|---|---|---|
| 1,841,055 | Reppe et al. | Jan. 12, 1932 |
| 1,923,569 | Mueller-Cunradi et al. | Aug. 22, 1933 |
| 1,950,441 | Carothers | Mar. 13, 1934 |
| 2,018,065 | Ipatieff | Oct. 22, 1935 |
| 2,197,956 | Vaughn | Apr. 23, 1940 |
| 2,250,558 | Vaughn | July 29, 1941 |
| 2,347,955 | Korpi | May 2, 1944 |